United States Patent [19]

Geisthoff

[11] Patent Number: 4,607,538

[45] Date of Patent: Aug. 26, 1986

[54] ANGULAR TORQUE TRANSMISSION MECHANISM

[75] Inventor: Hubert Geisthoff, Lohmar, Fed. Rep. of Germany

[73] Assignee: Jean Walterscheid GmbH, Lohmar/Rhld., Fed. Rep. of Germany

[21] Appl. No.: 638,744

[22] Filed: Aug. 8, 1984

[30] Foreign Application Priority Data

Aug. 23, 1983 [DE] Fed. Rep. of Germany ....... 3330311

[51] Int. Cl.⁴ .......................... F16H 1/14; F16H 1/20; F16H 55/17; F16H 7/00
[52] U.S. Cl. ....................................... 74/417; 474/148; 474/153; 474/205; 74/416; 74/459.5; 74/423
[58] Field of Search ...................... 474/62, 61, 63, 148, 474/149, 150, 153, 205; 74/417, 416, 423, 424, 457, 459.5

[56] References Cited

U.S. PATENT DOCUMENTS

| | | | |
|---|---|---|---|
| 2,235,427 | 3/1941 | Harris | 74/417 |
| 3,334,987 | 8/1967 | Stutske | 74/423 |
| 4,402,234 | 9/1983 | Malarz et al. | 74/417 |

FOREIGN PATENT DOCUMENTS 2445209  4/1976  Fed. Rep. of Germany ........ 74/417

Primary Examiner—Lawrence J. Staab
Assistant Examiner—Michael D. Bednarek
Attorney, Agent, or Firm—Toren, McGeady, Stanger, Goldberg & Kiel

[57] ABSTRACT

An angular transmission mechanism having two axles angularly disposed for torque transmission therebetween by two bevel gears which are embraced by an elastic toothed belt having a surface area which, in the untensioned condition of said belt, has the shape of a truncated cone, the belt having teeth which correspond to the teeth of the bevel gears.

6 Claims, 4 Drawing Figures

ANGULAR TORQUE TRANSMISSION MECHANISM

The present invention relates generally to torque transmission devices and more particularly to an angular transmission for transmitting torque between two axles arranged to an angle relative to each other. The invention is particularly suitable for use in agricultural applications and comprises a mechanism, consisting of two bevel gears provided with teeth.

An angular transmission for driving tools by means of an air-operated engine is known from DE-OS No. 25 36 853. The angular transmission described is characterized by the use of two shafts both of which are provided with bevel gears and which are adjustable through their clearance.

Among the disadvantages of the angular transmission described are that the production of the gear pair requires close tolerances, that the transmission is not elastic and that the contact between the gears results in a high noise level.

It is an object of the present invention to provide an angular transmission for agricultural applications which, without any special measures of enclosure, is insensitive to dirt, does not require precision forming and exhibits elastic behavior.

SUMMARY OF THE INVENTION

In accordance with the invention, the objective is achieved in that the bevel gears are embraced by an elastic toothed belt whose surface area, in an untensioned condition, has the shape of a truncated cone and which has teeth which correspond to the teeth of the bevel gears.

The advantage of the angular transmission design in accordance with the invention is that the bevel gear teeth are not subject to high requirements of accuracy so that forming processes may be applied. The elastic toothed belt ensures that the transmission exhibits an elastic behavior capable of handling impact loads.

A particularly advantageous embodiment of the invention is obtained by ensuring that the flanks of the teeth extend so as to be parallel to each other, so that the gaps between the teeth become narrower toward the tapered end of the bevel gears. As a result, the toothed belt is held to a sufficient extent on the bevel gears themselves, which means that additional guiding means are not required.

In a further advantageous embodiment of the invention, provision is made for at least one guiding pulley at the end where the axes of the two bevel gears intersect. In this case, the toothed belt is guided by the additionally arranged guiding pulley.

According to a further feature of the invention, each of the two belt sections is supported on a guiding pulley arranged so as to be freely rotatable on a joint axis which is perpendicular to the plane formed by the axes of the bevel gears.

In a further advantageous embodiment, the toothed belt, on both sides, in the plane which is common to both axes of the bevel gears, is supported on a conically shaped guiding pulley and the axis of the guiding pulley is positioned on the common plane.

The aforementioned features permit a free design of the tooth shape without adversely affecting the running behavior of the boothed belt on the bevel gears.

According to a further advantageous feature of the invention, the guiding pulley(s) is/are adjustable relative to the point of intersection of the axes of the bevel gears.

This measure simultaneously permits tensioning of the toothed belt.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENT

Figure 1:
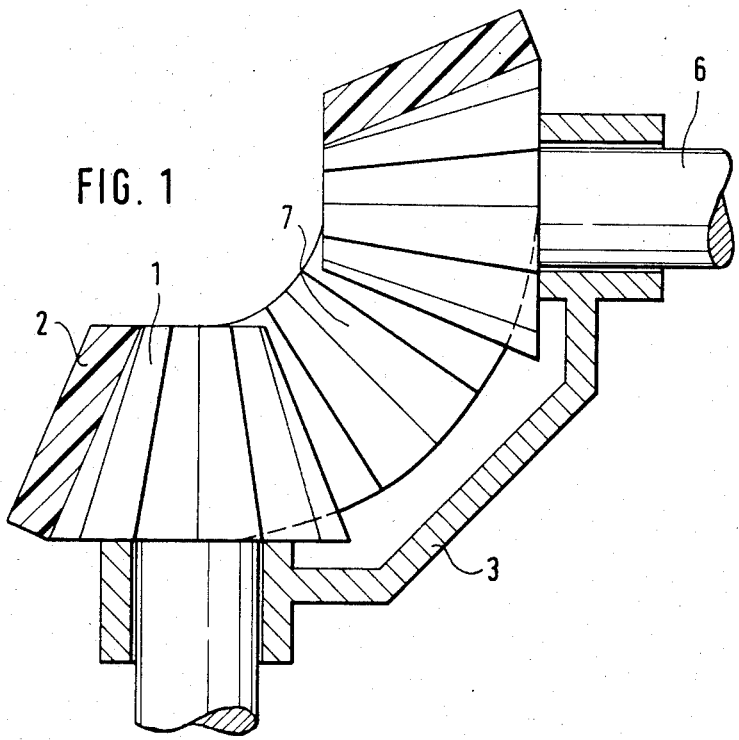
FIG. 1 is a sectional view showing an angular transmission mechanism in accordance with the invention.

The angular transmission mechanism shown in FIG. 1 essentially consists of two bevel gears 1 which are held by a joint supporting frame 3 and which are rotatively connected to each other by a toothed belt 2. In the embodiment of FIG. 1, care has to be taken to ensure that the gaps between the teeth of the bevel gears 1 are tapered in accordance with the bevels in order to support the toothed belt 2 on the bevel gears 1 and to prevent the toothed belt 2 from sliding off.

Figure 2:
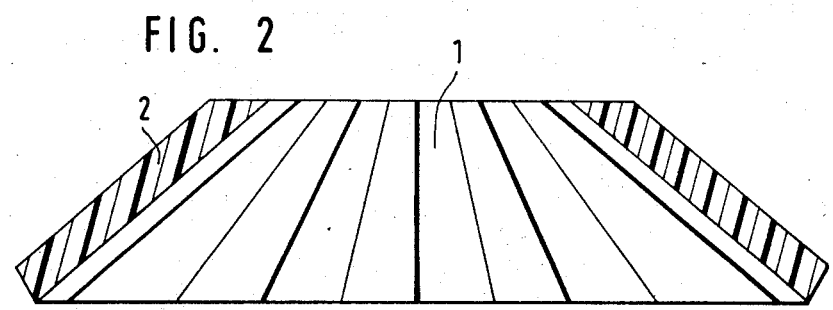
FIG. 2 is a sectional lateral view of a bevel gear with a tensioned toothed belt.

FIG. 2 is a lateral view of the bevel gear 1 with the toothed belt 2 in position.

Figure 3:
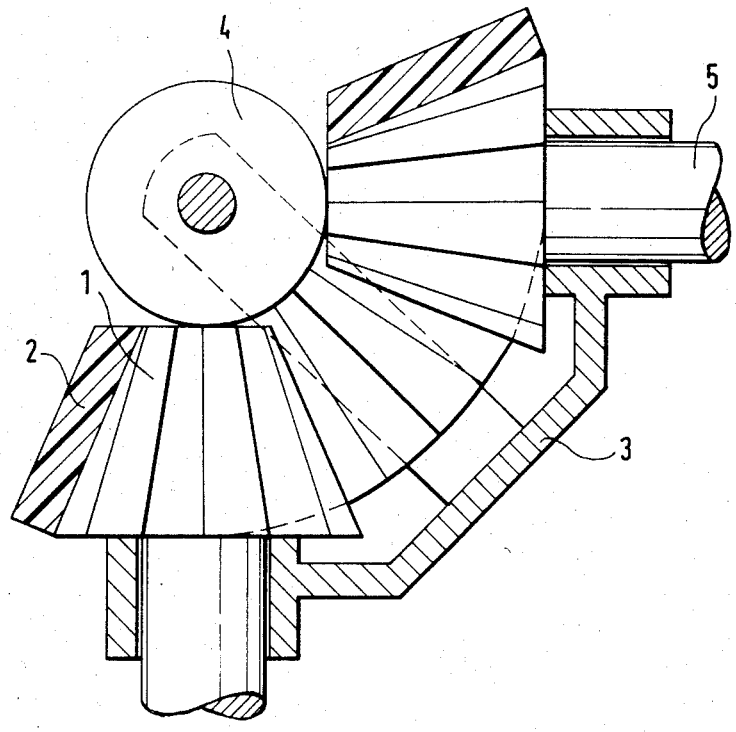
FIG. 3 is a sectional view showing the design of an angular transmission mechanism having two guiding pulleys supporting the belt sections.

FIG. 3 illustrates an angular transmission wherein each of the two sections of the toothed belt 2 is supported by a freely rotatable guiding pulley 4 arranged on a common axis.

Figure 4:
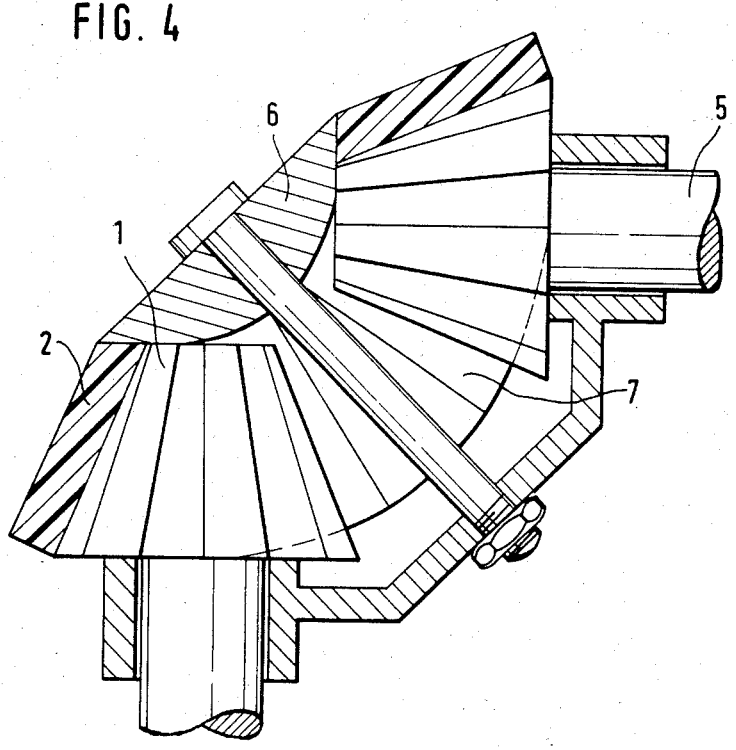
FIG. 4 is a sectional view which illustrates an angular transmission mechanism with one single guiding pulley supporting the toothed belt on both sides.

FIG. 4 illustrates an embodiment of the angular transmission in accordance with the invention wherein the toothed belt 2 is supported on both sides of the plane of the two axes 5 by a single guiding pulley 6 designed as a cone or a spherical section.

Thus, it will be seen that the invention provides an angular transmission mechanism suitable for use on agricultural tractors and implements, which does not require sophisticated measures to protect it against dirt and which exhibits an elastic behavior in operation.

The objectives of the invention are achieved in whole or in part in that the toothed bevel gears which are arranged at an angle relative to each other are connected to each other by a toothed belt whose surface area, in an untensioned condition, has the shape of a truncated cone.

While specific embodiments of the invention have been shown and described in detail to illustrate the application of the inventive principles, it will be understood that the invention may be embodied otherwise without departing from such principles.

What is claimed is:

1. An angular transmission mechanism for transmitting torque between two axles arranged at an angle relative to each other, particularly for use in agricultural applications and consisting of two bevel gears provided with teeth, comprising:

an elastic toothed belt embracing said bevel gears, said toothed belt having a surface area which, in an untensioned condition of said belt, is shaped in the form of a truncated cone, said belt having teeth which corresponds to the teeth of said bevel gears.

2. A mechanism according to claim 1, wherein said teeth of said bevel gears have flanks which extend so as to be parallel to each other.

3. A mechanism according to claim 1, wherein
said two bevel gears have axes, respectively, which have ends that intersect, there being provided at said ends at least one guiding pulley.

4. A mechanism according to claim 1, wherein
said elastic toothed belt comprises two belt sections, each of which is supported on a guiding pulley arranged so as to be freely rotatable on a joint axis which is perpendicular to a plane formed by axes of said bevel gears.

5. A mechanism according to claim 1, wherein
each of said bevel gears define an axis and wherein said toothed belt is supported on both sides in a plane which is common to both axes of said bevel gears on a conically shaped guiding pulley and wherein the axis of said guiding pulley is positioned on said common plane.

6. A mechanism according to claim 5, wherein
said guiding pulley is adjustable relative to a point of intersection of said axes of said bevel gears.

* * * * *